(12) United States Patent
Cho et al.

(10) Patent No.: US 11,006,108 B2
(45) Date of Patent: May 11, 2021

(54) IMAGE PROCESSING APPARATUS, METHOD FOR PROCESSING IMAGE AND COMPUTER-READABLE RECORDING MEDIUM

(71) Applicant: Samsung Electronics Co., Ltd., Suwon-si (KR)

(72) Inventors: Ki-heum Cho, Seoul (KR); Yong-sup Park, Seoul (KR); Jae-yeon Park, Seoul (KR); Chang-han Kim, Goyang-si (KR); Il-jun Ahn, Suwon-si (KR); Hee-seok Oh, Seoul (KR); Tammy Lee, Seoul (KR); Min-su Cheon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 124 days.

(21) Appl. No.: 16/130,253

(22) Filed: Sep. 13, 2018

(65) Prior Publication Data
US 2019/0082177 A1  Mar. 14, 2019

(30) Foreign Application Priority Data

Sep. 14, 2017 (KR) .......................... 10-2017-0117646

(51) Int. Cl.
*H04N 19/117* (2014.01)
*H04N 19/134* (2014.01)
(Continued)

(52) U.S. Cl.
CPC .......... *H04N 19/117* (2014.11); *G06T 3/4053* (2013.01); *H04N 19/115* (2014.11);
(Continued)

(58) Field of Classification Search
CPC .. H04N 19/117; H04N 19/115; H04N 19/134; H04N 19/154; H04N 19/172;
(Continued)

(56) References Cited

U.S. PATENT DOCUMENTS 6,445,418 B1  9/2002  Oh et al.
7,076,114 B2  7/2006  Westerman
(Continued)

FOREIGN PATENT DOCUMENTS

CN   106447621 A   2/2017
CN   104318534 B   6/2017
(Continued)

OTHER PUBLICATIONS

International Search Report and Written Opinion dated Jan. 3, 2019, issued in a counterpart an International Application No. PCT/KR2018/010432.
(Continued)

*Primary Examiner* — Zhitong Chen
(74) *Attorney, Agent, or Firm* — Jefferson IP Law, LLP

(57) ABSTRACT

An image processing apparatus is provided. The image processing apparatus includes a processor configured to, in response to an image including a plurality of frames being input, change a predetermined parameter to a parameter corresponding to a compression rate of each of the plurality of frames for each frame, and process the input image by using the parameter changed for each frame, and an output interface configured to output the processed image.

16 Claims, 9 Drawing Sheets

(51) Int. Cl.
*G06T 3/40* (2006.01)
*H04N 19/80* (2014.01)
*H04N 19/86* (2014.01)
*H04N 19/176* (2014.01)
*H04N 19/115* (2014.01)
*H04N 19/172* (2014.01)
*H04N 19/154* (2014.01)

(52) U.S. Cl.
CPC ......... *H04N 19/134* (2014.11); *H04N 19/154* (2014.11); *H04N 19/172* (2014.11); *H04N 19/176* (2014.11); *H04N 19/80* (2014.11); *H04N 19/86* (2014.11)

(58) Field of Classification Search
CPC ...... H04N 19/176; H04N 19/80; H04N 19/86; G06T 3/4053
See application file for complete search history.

(56) References Cited

U.S. PATENT DOCUMENTS

| | | |
|---|---|---|
| 7,346,208 B2 | 3/2008 | Staelin et al. |
| 8,731,062 B2 | 5/2014 | Kanumuri et al. |
| 8,731,337 B2 | 5/2014 | Lin et al. |
| 9,077,989 B2 | 7/2015 | Sato |
| 2002/0118862 A1* | 8/2002 | Sugimoto ............... G06T 7/20 382/103 |
| 2008/0043027 A1* | 2/2008 | Shiomi ............... G09G 3/3648 345/501 |
| 2008/0111831 A1 | 5/2008 | Son et al. |
| 2009/0290803 A1* | 11/2009 | Jo ............... G06T 5/004 382/233 |
| 2011/0310437 A1 | 12/2011 | Guo et al. |
| 2012/0130808 A1* | 5/2012 | Paz ............... H04N 21/6587 705/14.52 |
| 2013/0002968 A1 | 1/2013 | Bridge et al. |
| 2016/0321523 A1* | 11/2016 | Sen ............... G06T 5/002 |
| 2019/0050664 A1* | 2/2019 | Yang ............... G06F 3/012 |

FOREIGN PATENT DOCUMENTS

| | | |
|---|---|---|
| JP | 4734239 B2 | 7/2011 |
| KR | 10-1378749 B1 | 3/2014 |
| WO | 2004/112393 A1 | 12/2004 |
| WO | 2010/120338 A2 | 10/2010 |

OTHER PUBLICATIONS

Ke Yu et al., "Deep Convolution Networks for Compression Artifacts Reduction," CVPR, 2015.
Jun Guo et al., "One-to-Many Network for Visually Pleasing Compression Artifacts Reduction," CVPR, 2017.

* cited by examiner

IMAGE PROCESSING APPARATUS, METHOD FOR PROCESSING IMAGE AND COMPUTER-READABLE RECORDING MEDIUM

CROSS-REFERENCE TO RELATED APPLICATION

This application is based on and claims priority under 35 U.S.C. § 119(a) of a Korean Patent Application number 10-2017-0117646, filed on Sep. 14, 2017, in the Korean Intellectual Property Office, and the disclosure of which is incorporated by reference herein in its entirety.

BACKGROUND

1. Field

The disclosure relates to an image processing apparatus, a method for processing an image, and a computer-readable recording medium. More particularly, the disclosure relates to an image processing apparatus for generating a high-quality image of a predetermined level from a low-quality image of a variable image quality, a method for processing an image, and a computer-readable recording medium.

2. Description of Related Art

Researches have been largely conducted to improve a picture quality from the aspects of peak signal-to-noise ratio (PSNR), structural similarity (SSIM) and the like which are commonly used in a quantitative picture quality evaluation.

Thanks to the recent advancement of artificial intelligence (AI), the artificial intelligence has been increasingly applied to improve picture quality. However, there is still a shortcoming in performance of improving image quality in response to image quality fluctuation due to a moving image transmission environment such as a transmission medium, a resolution, a bit rate, various codecs, and the like, only by a technique of improving fixed image quality of a single image.

In a case in which different machine learning networks are applied according to the degree of quality of an image in response to a variable image quality, there is a problem that a memory is increased in proportion to a range of image quality.

To resolve this problem, an image quality improvement technology optimized for a variable image quality while minimizing an amount of memory consumption is demanded.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an image processing apparatus performing an optimized image quality improvement process in real-time response to a variable image quality, an image processing method, and a computer-readable recording medium.

In accordance with an aspect of the disclosure, an image processing apparatus is provided. The image processing apparatus includes a processor configured to, in response to an image including a plurality of frames being input, change a predetermined parameter to a parameter corresponding to a compression rate of each of the plurality of frames for each frame, and to process the input image by using the parameter changed for each frame, and an output interface configured to output the processed image.

The image processing apparatus may further include a memory configured to store the predetermined parameter corresponding to each of a plurality of predetermined compression rates. The processor may, if a compression rate of a frame is one of a plurality of predetermined compression rates, perform an image process using a parameter corresponding to the compression rate from among the stored parameter, and if a compression rate of a frame is different from the plurality of predetermined compression rates, perform an image process by calculating a new parameter and store the new parameter in the memory.

The processor may analyze linearity between a compression rate and a parameter by using the plurality of compression rates and the predetermined parameter, and calculate a new parameter corresponding to a new compression rate based on the analyzed linearity.

The predetermined parameter may be calculated as a result of machine learning of a plurality of frames having a same compression rate.

The image process may be at least one of decoding and image quality improvement process for the plurality of frames. The parameter may be a parameter for each of the decoding and the image quality improvement process.

The image quality process may include a first process to acquire a structural feature of an image and a second process to normalize the acquired structural feature. The parameter may include a first parameter used in the second process.

A second parameter used in the first process may have a same value even if a compression rate of a frame is changed.

The processor may be configured to acquire a compression rate of each of the plurality of frames by using a metadata of the plurality of frames.

The output interface may include a communication interface for transmitting the processed image to an external apparatus.

The output interface may include a display for displaying the processed image.

In accordance with another aspect of the disclosure, a method for processing an image is provided. The method includes receiving input of an image including a plurality of frames, changing a predetermined parameter to a parameter corresponding to a compression rate of each of the plurality of frames for each frame, processing the input image by using the parameter changed for each frame, and outputting the processed image.

The method may further include storing the predetermined parameter corresponding to each of a plurality of predetermined compression rates. The processing the image may include, if a compression rate of a frame is one of a plurality of predetermined compression rates, performing an image process using a parameter corresponding to the compression rate from among the stored parameter, and if a compression rate of a frame is different from the plurality of predetermined compression rates, performing an image process by calculating a new parameter and storing the new parameter in the memory.

The processing the image may include analyzing linearity between a compression rate and a parameter by using the plurality of compression rates and the predetermined parameter, and calculating a new parameter corresponding to a new compression rate based on the analyzed linearity.

The predetermined parameter may be calculated as a result of machine learning of a plurality of frames having a same compression rate.

The image process may be at least one of decoding and image quality improvement process for the plurality of frames. The parameter may be a parameter for each of the decoding and the image quality improvement process.

The image quality process may include a first process to acquire a structural feature of an image and a second process to normalize the acquired structural feature. The parameter may include a first parameter used in the second process.

A second parameter used in the first process may have a same value even if a compression rate of a frame is changed.

The method may further include acquiring a compression rate of each of the plurality of frames by using a metadata of the plurality of frames.

The outputting may include displaying the processed image or transmitting the processed image to an external apparatus.

In accordance with yet another aspect of the disclosure, non-transitory computer-readable recording medium comprising a program for executing a method for processing an image is provided. The method for processing the image may include receiving input of an image including a plurality of frames, changing a predetermined parameter to a parameter corresponding to a compression rate of each of the plurality of frames for each frame, and processing the input image by using the parameter changed for each frame.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
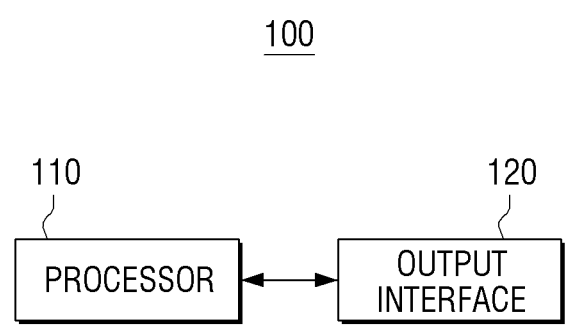
FIG. 1 is a block diagram provided to explain a brief configuration of an image processing apparatus, according to an example embodiment.

Hereinafter, the terms used in example embodiments will be briefly explained, and exemplary embodiments will be described in greater detail with reference to the accompanying drawings.

The terms used in the example embodiments of the present disclosure are general terms which are widely used now and selected considering the functions of the present disclosure. However, the terms may vary depending on the intention of a person skilled in the art, a precedent, or the advent of new technology. In addition, in a specified case, the term may be arbitrarily selected. In this case, the meaning of the term will be explained in the corresponding description. Accordingly, the terms used in the description should not necessarily be construed as simple names of the terms, but be defined based on meanings of the terms and overall contents of the present disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

In the present disclosure, relational terms such as first and second, and the like, may be used to distinguish one entity from another entity, without necessarily implying any actual relationship or order between such entities. In embodiments of the present disclosure, relational terms such as first and second, and the like, may be used to distinguish one entity from another entity, without necessarily implying any actual relationship or order between such entities.

It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In an example embodiment, 'a module' or 'a unit' performs at least one function or operation, and may be realized as hardware, software, or combination thereof. Further, a plurality of 'modules' or a plurality of 'units' are integrated into at least one module except for the 'module' or 'unit' which needs to be implemented by specific hardware and thus may be implemented by at least one processor.

The above and other aspects of the present disclosure will become more apparent by describing in detail exemplary embodiments thereof with reference to the accompanying drawings. However, exemplary embodiments may be realized in a variety of different configurations, and not limited to descriptions provided herein. Further, those that are irrelevant with the description are omitted so as to describe exemplary embodiments more clearly, and similar drawing reference numerals are used for the similar elements throughout the description.

Hereinafter, example embodiments will be described in detail with reference to accompanying drawings.

FIG. 1 is a block diagram provided to explain a brief configuration of an image processing apparatus, according to an example embodiment.

Referring to FIG. 1, an image processing apparatus 100 may include a processor 110 and an output interface 120. The image processing apparatus 100 may be implemented in a form of a set-top box and server processing an input image and transmitting the processed image to an additional display apparatus. However, the example is not limited thereto, and it may be a display apparatus such as a TV, PC, a mobile apparatus and the like which includes a display capable of displaying a content in the apparatus itself.

When an image including a plurality of frames is input, the processor 110 may change a predetermined parameter to a parameter corresponding to a compression rate of the respective frames. The processor 110 may acquire a compression rate of each of the plurality of frames by using metadata of the frames. In this case, the processor 110 may change a parameter for each frame. In addition, the predetermined parameter may be pre-stored in a memory illustrated in FIG. 2 which will be described later.

Meanwhile, specific parameter changing operation will be described in detail with reference to FIGS. 2-8.

In addition, the processor 110 may perform an image process for an input image by means of a changed parameter. In detail, the processor 110 may perform an image process for each of the frames by means of a parameter changed for each frame. The image process may include an image quality improvement process for the plurality of frames. In this case, a parameter corresponding to each of the frames may be a parameter for image quality improvement process of a frame. When the input image is a compressed image rather than a decoded compressed image, the image process may include decoding of a plurality of frames. In this case, a parameter corresponding to each of the frames may be a parameter for decoding of a frame.

The image quality improvement process may include a first process which acquires a structural feature of an input image. The structural feature may be a feature which is capable of being objectively acquired upon analysis of an image, which may include not only an attribute of image such as a brightness, color sense, light and shade, chroma, contrast and the like of an image, but also a feature included in an image frame such as a difference of contour included in one entire frame of an image, position of edge, thickness, clarity, brightness around an edge, color sense, light and shade, chroma and the like. In detail, the processor 110 may perform a first process to acquire a structural feature from each of a plurality of input frames. A parameter used in the first process may be the same value even if a compression rate of a frame is changed. This is because a structural feature in an image of a plurality of frames is similar, and thereby a memory consumption required for image quality improvement process can be significantly reduced.

In addition, the image quality improvement process may include a second process to perform feature normalization of a structural feature acquired from each of the frames. A parameter used in the second process may be changed according to a compression rate of a frame. In detail, the processor 110 may normalize a structural feature acquired from each of the frames through the first process via a batch normalization layer, and process the normalized structural feature by means of a scale factor and a shift factor. A parameter used in the second process may include a parameter required to normalize the acquired structural feature, a scale factor, and a shift factor. Meanwhile, the second process may be expressed in the mathematical equation (1) as shown below.

$$BN = \alpha * \text{norm}(\text{conv}) + \beta \quad (1)$$

The BN may refer to a value processed by batch normalization, the cony may be a feature value acquired by first process, the norm may refer to normalization, the α may refer to a scale factor, and the β may refer to a shift factor.

Meanwhile, the processor 110 may repeatedly perform the first process and the second process.

The output interface 120 may output a processed image. In detail, the output interface 120 may transmit the processed image to an external apparatus. In this case, the output interface 120 may include a communication interface capable of communicating with an external apparatus.

The output interface 120 may display a processed image. In this case, the output interface 120 may include a display capable of displaying an image.

As described above, according to an example embodiment, a parameter may be changed according to a compression rate of a plurality of frames of an input image, and an image process is performed for each of the frames by means of the changed parameter. Thereby, it is possible to perform an optimized image quality improvement process for each frame even if an image having a variable image quality is input for each frame.

Figure 2:
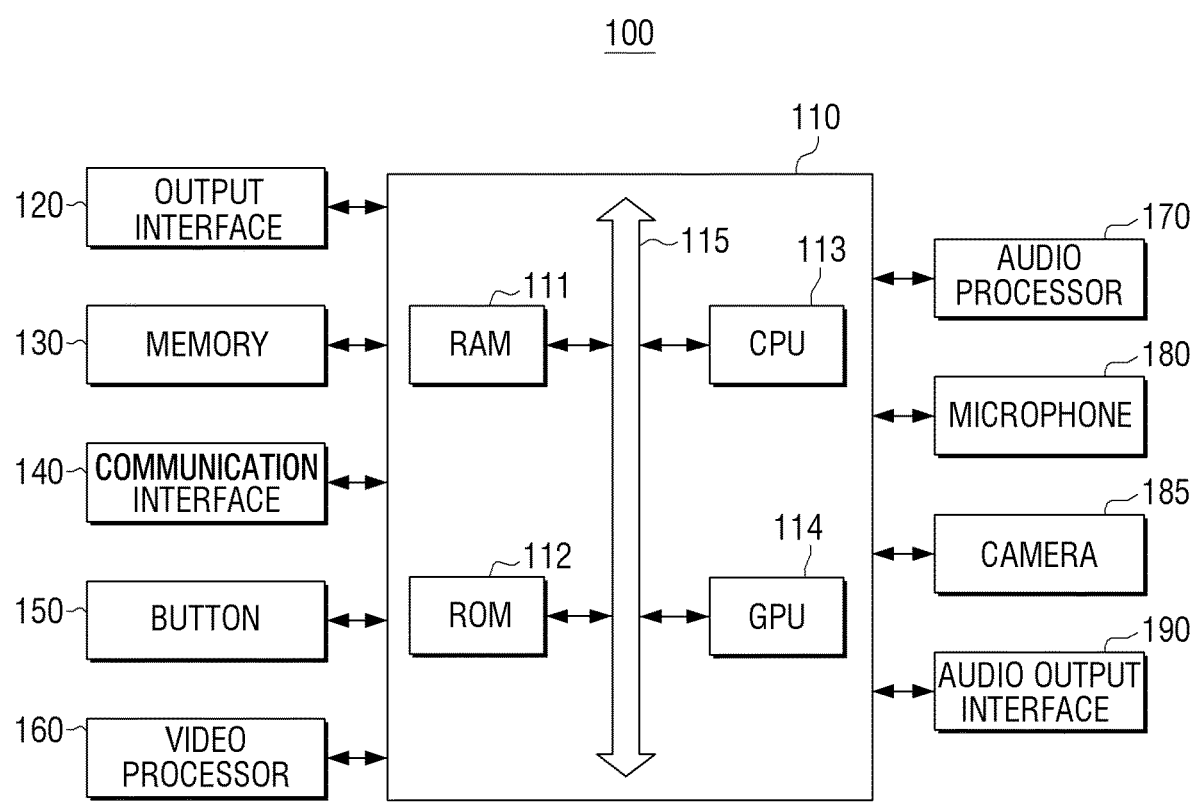
FIG. 2 is a block diagram provided to explain a specific configuration of an image processing apparatus, according to an example embodiment.

FIG. 2 is a block diagram provided to explain a specific configuration of an image processing apparatus, according to an example embodiment.

Referring to FIG. 2, an image processing apparatus 100 may include a processor 110, an output interface 120, a memory 130, a communication interface 140, a button 150, a video processor 160, an audio processor 170, a microphone 180, a camera 185, and an audio output interface 190.

The processor 110 may include a RAM 111, a ROM 112, a CPU 113, a graphic processing unit (GPU) 114, and a bus 115. The RAM 111, the ROM 112, the CPU 113, the GPU 114, and so on may be connected to each other a bus 115.

The CPU 113 accesses the memory 130 to perform booting using the OS stored in the memory 130. The CPU 1013 may perform various operations by using the various programs, contents, data, and the like stored in the memory 130.

The ROM 112 may store a set of instructions for system booting. When a turn-on command is input and thus the electric power is supplied, the CPU 113 may copy the stored O/S in the memory 130 to RAM 111 according to the commands stored in ROM 112, and boot the system by executing O/S. When the booting is completed, the CPU 113 may copy the various programs stored in the memory 130 to the RAM 111, and perform various operations by implementing the programs copied to the RAM 111.

The GPU 114 may display a UI on the output interface 120 when the booting of the image processing apparatus 100 is completed. In detail, the GPU 114 may generate an image including various objects such as an icon, an image, a text, etc. using a calculator (not shown) and a renderer (not shown). The computing unit computes property values such as coordinates, shape, size, and color of each object to be displayed according to the layout of the screen. The renderer generates screens of various layouts including objects based on the attribute values calculated by the operator. The screens (or user interface window) generated in the renderer may be provided to the display, and displayed on each of a main display area and a sub display area.

In the example embodiment described above, an image processing operation is performed by the GPU 114. However, in an implementation, the image processing operation may be performed by the CPU 113 or the GPU 114.

The output interface 120 may display a processed image. In this case, the output interface 120 may include a display for displaying a processed image. The display may display a processed image. A processed image displayed by the display may be an image which is generated by performing an image quality improvement process to an input image by means of a parameter changed for each frame. The display may be implemented as various types of displays, such as an LCD (Liquid Crystal Display), an OLED (Organic Light Emitting Diodes) display, and a PDP (Plasma Display Panel). The display may include a driving circuit, a backlight unit, and the like which may be implemented in forms such as an a-si TFT, a low temperature poly silicon (LTPS) TFT, an organic TFT (OTFT), and the like. In addition, the display may also be implemented as a flexible display.

In addition, the display may include a touch sensor for sensing a touch gesture of the user. The touch sensor may be implemented as various types of sensors such as a capacitive type, a resistive type, a piezoelectric type, and the like. The capacitive type means a scheme calculating a touch coordinate by sensing micro-electricity exited into a body of the user when a portion of the body of the user touches a surface of the display, using a dielectric coated on the surface of the display. The resistive type means a scheme including two electrode plates embedded in the display and calculating the touch coordinate by sensing that upper and lower plates of a touched point contact with each other to allow a current to flow, when the user touches the screen. Besides, when the image processing apparatus 100 supports a pen inputting function, the display may sense a user gesture that is performed by using input tools such as a pen as well as user fingers. When the input tools include a stylus pen including a coil, the image processing apparatus 100 may include a magnetic field sensor that can sense the magnetic field varied by the coil within the stylus pen. Accordingly, the touch screen may also sense an adjacent gesture, that is, a hovering as well as the touch gesture.

In the example embodiment described above, a display function and a gesture sensing function are performed in the same element, but may be displayed in different elements. In addition, according to various example embodiments, a display may not be provided in the image processing apparatus 100.

The memory 130 may be realized as a recording medium within the image processing apparatus 100 or as an external storage medium, such as a removable disk including a USB memory, a web server via network, etc. For example, the memory 130 may include a hard disk, a solid-state drive (SSD), a memory card, ROM, a USB memory, etc.

The memory 130 may store a predetermined parameter. For example, the memory 130 may store a parameter corresponding to each of a plurality of predetermined compression rates. The predetermined parameter stored in the memory 130 may be a result calculated through machine learning by inputting a plurality of frames having the same compression rate, which may be a value corresponding to a compression rate of an input frame.

In addition, the memory 130 may store a new parameter corresponding to a new compression rate calculated by the processor 110.

The communication interface 140 may be an element that communicates or interfaces with various external apparatuses according to various types of communication methods and protocols. For example, the communicator 140 may receive a compressed image from an external apparatus. The compressed image may include a plurality of frames, and each of the frames may be compressed at different compression rates. The communication interface 140 may transmit an image processed by the processor 110 to an external apparatus such as an additional display apparatus.

For example, the communication interface 140 may receive input of an image through a wired method such as an antenna, a cable or a port from an external apparatus, or receive input of an image through a wireless method such as Wi-Fi and Bluetooth. In an implementation, the image processing apparatus 100 may receive input of an image selected by a user from among a plurality of images stored in the memory 130 provided in the image processing apparatus 100, and process the image.

In a case in which the image processing apparatus 100 is capable of perform wireless communication, the communication interface 140 may include a Wi-Fi chip, a Bluetooth chip, a wireless communication chip, and a near-field communication (NFC) chip. Especially, the Wi-Fi chip and Bluetooth chip may each perform communication in the Wi-Fi method, and Bluetooth method, respectively. When the Wi-Fi chip or the Bluetooth chip is used, various connection information such as SSID and session key may be first exchanged, communication may be connected by using the connection information, and various information may be exchanged. The wireless communication chip represents a chip which communicates according to various communication standards such as IEEE, Zigbee, 3rd Generation (3G), 3rd Generation Partnership Project (3GPP), Long Term Evolution (LTE) and so on. The NFC chip may mean a chip or integrated circuit that operates by using a 13.56 MHz band from among various radio-frequency identification (RFID) frequency bands such as 135 kHz, 13.56 MHz, 433 MHz, 860-960 MHz, 2.45 GHz, or the like.

The processor 110 may process an image input by the communication interface 140 by means of a parameter for image process. For example, the image process may refer to an image quality improvement process, and the processor 110 may generate a high-quality image generated by performing an image quality improvement process to an input image by the frame by means of a parameter corresponding to a compression rate of each of a plurality of frames.

In the example embodiment described above, the output interface 120 and the communication interface 140 are separate elements. However, the output interface 120 may include some or all functions of the communication interface 140.

The button 150 may be various types of buttons such as a mechanical button, a touch pad, a wheel, and the like formed in an arbitrary area such as a front surface portion, a side surface portion, and a back surface portion of the outer surface of the main body of the image processing apparatus 100.

The video processor 160 is a constituent element that processes video data included in content received through the communicator 140 or stored in the memory 130. The video processor 160 may perform various image processing processes such as decoding, scaling, noise filtering, frame rate conversion, and resolution conversion on audio data.

When an image including a plurality of frames is input, the video processor 160 may change a predetermined parameter to a parameter corresponding to a compression rate of the respective frames. The video processor 160 may acquire a compression rate of each of the plurality of frames by using metadata of the frames. In this case, the video processor 160 may change a parameter by the frame. In addition, the predetermined parameter may be pre-stored in the memory 130.

In addition, the video processor 160 may perform an image process for an input image by means of a changed parameter. In detail, the video processor 160 may perform an image process for each of the frames by means of a parameter changed for each frame. The image process may include an image quality improvement process for the plurality of frames. In this case, a parameter corresponding to each of the frames may be a parameter for image quality improvement process of a frame. When the input image is a compressed image rather than a decoded compressed image, the image process may include decoding of a plurality of frames. In this case, a parameter corresponding to each of the frames may be a parameter for decoding of a frame.

The image quality improvement process may include a first process which acquires a structural feature of an input image. The structural feature may be a feature which is capable of being objectively acquired upon analysis of an image, which may include not only an attribute of image such as a brightness, color sense, light and shade, chroma, contrast and the like of an image, but also a feature included in an image frame such as a difference of contour included in one entire frame of an image, position of edge, thickness, clarity, brightness around an edge, color sense, light and shade, chroma and the like. In detail, the video processor 160 may perform a first process to acquire a structural feature from each of a plurality of frames inputted through the convolution layer. A parameter used in the first process may be the same value even if a compression rate of a frame is changed. This is because a structural feature in an image of a plurality of frames is similar, and thereby a memory consumption required for image quality improvement process can be significantly reduced.

In addition, the image quality improvement process may include a second process to perform feature normalization of a structural feature acquired from each of the frames. A parameter used in the second process may be changed according to a compression rate of a frame. In detail, the video processor 160 may normalize a structural feature acquired from each of the frames through the first process via a batch normalization layer, and process the normalized structural feature by means of a scale factor and a shift factor. A parameter used in the second process may include a parameter required to normalize the acquired structural feature, a scale factor, and a shift factor. Meanwhile, the second process may be expressed in the mathematical equation (1) as shown below.

$$BN = \alpha * \text{norm}(\text{conv}) + \beta \quad (1)$$

The BN may refer to a value processed by batch normalization, the cony may be a feature value acquired by first process, the norm may refer to normalization, the $\alpha$ may refer to a scale factor, and the $\beta$ may refer to a shift factor.

Meanwhile, the video processor 160 may repeatedly perform the first process and the second process.

When a compression rate of an input frame is one of a plurality of predetermined compression rates, the video processor 160 may perform an image process using a parameter corresponding to a compression rate of the input frame from among a plurality of parameters stored in the memory 130. The plurality of parameters stored in the memory 130 may correspond to the plurality of compression rates, respectively.

When a compression rate of an input frame is a new compression rate, the video processor 160 may calculate a parameter corresponding to the new compression rate. The new compression rate may refer to a case where a compression rate of an input frame is different from a plurality of predetermined compression rates. For example, the video processor 160 may analyze linearity between a compression rate and a parameter by using a plurality of predetermined compression rates and the corresponding parameter. In addition, the video processor 160 may calculate a new parameter corresponding to a new compression rate based on the analyzed linearity. This operation will be described in detail with reference to FIG. 7 as shown below.

In addition, the video processor 160 may perform an image process by means of the calculated new parameter. For example, the video processor 160 may perform a second process using the calculated new parameter. As described above, the second process may be performed by changing a parameter, and thereby a visual feature of the input image may be adjusted.

The visual feature may be a feature which can be recognized by a user when the user sees an image, which may include not only attributes of an image such as a brightness, color sense, light and shade, chroma, contrast, etc. of an image, but also a texture feature indicating a texture felt from a form of frequency of an image signal of each of areas in an image, a form and density of an edge included in an image, an arrangement of color, etc.

The audio processor 170 is a constituent element that processes content received through the communicator 140 or audio data included in the content stored in the memory 130. The audio processor 170 may perform various processes such as decoding, amplification, and noise filtering on the audio data.

When a playback application for multimedia contents is executed, the processor 110 may drive the video processor 160 and the audio processor 170 to playback the corresponding contents. In this case, a display of the output interface 120 may display the image frame generated by the video processor 160 on at least one area of a main display area and a sub-display area.

The microphone 180 is a configuration for receiving and converting a voice of the user or other sounds into the audio data. The processor 110 may use the user voice input through the microphone 180 during a call process or convert the user voice into audio data and store the audio data in the memory 130. The microphone 180 may include a plurality of stereo microphones for receiving sound from a plurality of positions.

The camera 185 is a configuration for imaging a still image or a moving image according to a control of the user. The camera 185 may be implemented by a plurality of cameras such as a front camera and a rear camera. As described above, the camera 185 may be used as a means for obtaining an image of the user in an example for tracking a gaze of the user.

When the camera 185 and the microphone 180 are provided, the processor 110 may perform controlling operation according to the user voice inputted through the microphone 180 or the user motion recognized by the camera 185. That is, the image processing apparatus 100 may operate in a motion control mode or in a voice control mode. In the case in which the image processing apparatus 100 is operated in the motion control mode, the processor 110 activates the camera 185 to image the user, and tracks a change in the motion of the user to perform a control operation corresponding to the change in the motion of the user. In the case in which the user terminal apparatus 100 is operated in the voice control mode, the processor 110 may analyze the voice of the user input through the microphone 180, and may also be operated in a voice recognizing mode performing a control operation according to the analyzed voice of the user.

In the image processing apparatus 100 that supports a motion control mode or a sound control mode, voice recognition technology or motion recognition technology may be used in the above-described various exemplary embodiments. For example, if the user makes a motion as if the user is selecting an object displayed on a home screen, or states a voice command that corresponds to the object, it is determined that the corresponding object is selected and the control operation that matches the object may be performed.

Further, the audio output interface 190 outputs the audio data generated in the audio processor 170.

Further, although not illustrated in FIG. 2, the image processing apparatus 100 may additionally include a universal serial bus (USB) port which is configured to be connected with a USB connector, various external inputting ports which are configured to connect various external components such as headset, mouse, and a local area network (LAN), a DMB chip to receive and process a DMB (Digital Multimedia Broadcasting) signal, and various sensors.

Figure 3:
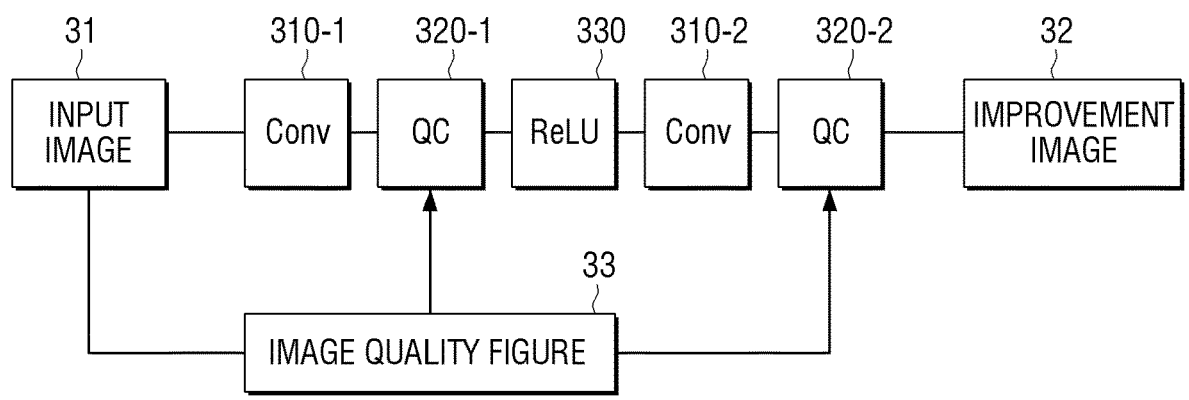
FIG. 3 is a block diagram provided to schematically explain an operation of an image processing apparatus, according to an example embodiment.

FIG. 3 is a block diagram provided to schematically explain an operation of an image processing apparatus, according to an example embodiment.

Referring to FIG. 3, an image processing apparatus may generate an improvement image 32 by performing an image quality improvement process to an input image 31. For example, the image processing apparatus may perform an image quality improvement process by passing the input image 31 through a plurality of layers 310-1, 310-2, 320-1, 320-2 and 330 for image quality improvement process.

First, the image processing apparatus may perform a first process to acquire a structural feature of an image while passing the input image 31 through a convoluton (cony) layer 310-1. The input image 31 may include a plurality of frames, and the image processing apparatus 100 may acquire a structural feature of each of the plurality of frames.

In addition, the image processing apparatus 100 may perform a second process to pass the acquired structural feature through a quality control (QC) layer 320-1 and normalize the structural feature. The image processing apparatus may perform the second process for the corresponding frame by using an image quality figure 33 corresponding to a compression rate of each of the plurality of frames. An image quality figure 33 corresponding to a compression rate of each of the frames may be acquired using metadata of a frame.

For example, the image processing apparatus may perform the second process by using a pre-stored parameter according to whether a compression rate is pre-stored, or may change a pre-stored parameter by using the image quality figure 33, and perform the second process using the changed parameter. This operation will be described below in greater detail with reference to FIGS. 4-8.

The image processing apparatus may selectively pass the input image 31 through a rectified linear unit (ReLU) 330 layer. An ReLU function may be to resolve a problem that it cannot be understood how an input value affects an output value across a number of layers or that an impact on the output value becomes insignificant, and may perform a process so that a value less than 0 is indicated by 0 and that a value greater than 0 is indicated in a form of a linear function. Accordingly, it is possible to more clearly observe an impact that an input value has on an output value and thus, an accurate learning can be possible.

Meanwhile, the image processing apparatus may perform an image quality improvement process by repeatedly passing the input image 31 through a plurality of layers 310-2 and 320-2 performing the same function as the plurality of layers 310-1, 320-1 and 330 described above. Meanwhile, various example embodiments to change a parameter will be described in detail with reference to FIGS. 4-8.

Figure 4:
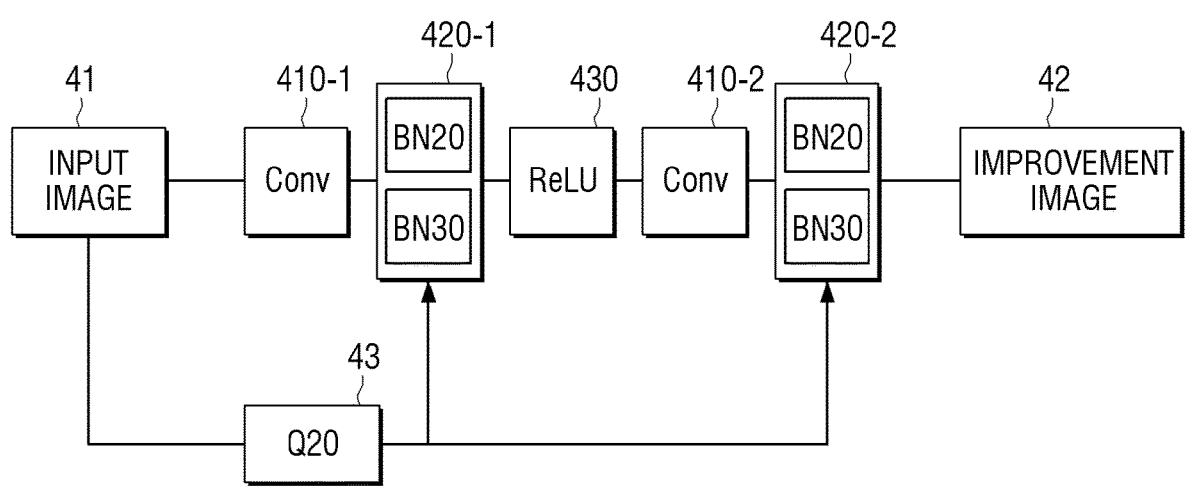
FIGS. 4, 5, 6, 7, and 8 are diagrams provided to explain an operation of an image process, according to various example embodiments.
Figure 5:
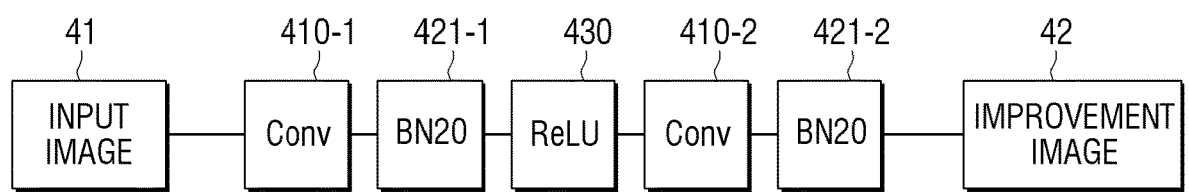

FIGS. 4 and 5 are diagrams to illustrate an operation of an image processing apparatus in a case in which a compression rate of an input frame is one of predetermined compression rates. A predetermined compression rate may be a compression rate of a frame corresponding to a pre-stored parameter. In addition, the pre-stored parameter may be calculated as a result of machine learning for a plurality of frames having the same compression rate.

Referring to FIG. 4, the image processing apparatus may generate an improvement image 42 by performing an image quality improvement process to the input image 41. For example, the image processing apparatus may perform an image quality improvement process by passing the input image 41 through a plurality of layers 410-1, 410-2, 420-1, 420-2 and 430 for image quality improvement process.

In this regard, the first process to acquire a structural feature of an image by passing the input image 41 through the convolution layer 410-1 and a process operation of selectively passing the input image 41 through the ReLU layer 430 are the same as an operation of FIG. 3 and thus, the description thereof will be omitted.

The image processing apparatus may perform a second process to pass a structural feature acquired from the input image 41 through the quality control (QC) layer 420-1 and normalize the structural feature. For example, the image processing apparatus may perform the second process for the corresponding frame by using an image quality figure 43 corresponding to a compression rate of a frame. An image quality figure 43 corresponding to a compression rate of a frame may be acquired using metadata of a frame.

The image processing apparatus may pre-store a parameter corresponding to a predetermined compression rate. Referring to FIG. 4, the image processing apparatus may store BN 20 which is a parameter corresponding to a compression rate of 20% and BN 30 which is a parameter corresponding to a compression rate of 30%. Accordingly, a predetermined compression rate may be 20% and 30%. The BN 20 may be a result value optimized by inputting a plurality of frames of a compression rate of 20% and processing the input frames and through machine learning. The BN 30 may be a result calculated through machine learning regarding the compression rate of 30%.

The image processing apparatus may perform the second process using the image quality figure 430 of the input image 41. The image quality figure 43 may correspond to a compression rate of the input image 41. Referring to FIG. 4, a compression rate of the input image 41 may be 20% from among predetermined compression rates of 20% and 30%.

In this case, as illustrated in FIG. 5, the image processing apparatus may generate the improvement image 42 by performing the second process using the BN 20 which is a parameter corresponding to a compression rate of the input image 41 from among the pre-stored parameters BN 20 and BN 30 through the quality control layer 421-1.

The image processing apparatus may perform an image quality improvement process by repeatedly passing the input image 31 through a plurality of layers 410-2 and 421-2 performing the same function as the plurality of layers 410-1, 421-1 and 430 described above.

Figure 6:
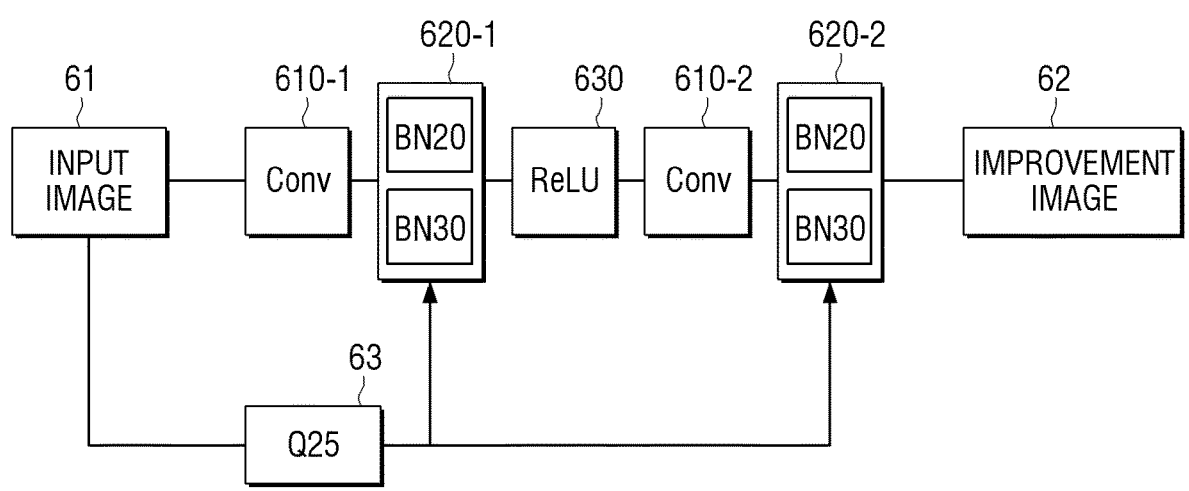
Figure 7:
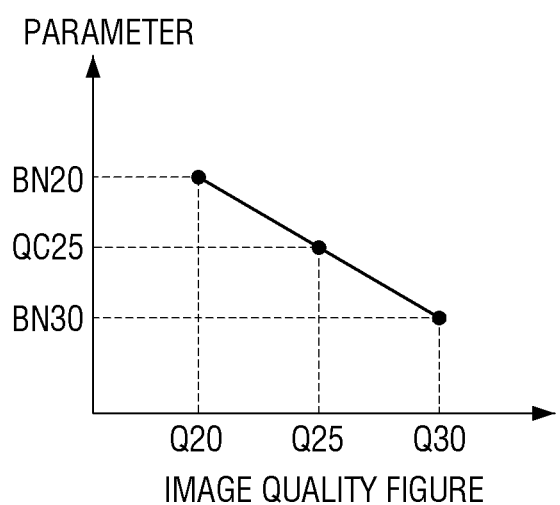
Figure 8:
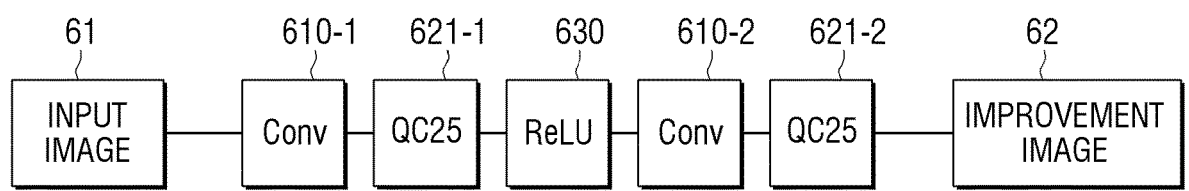

FIGS. 6-8 are diagrams to illustrate an operation of an image processing apparatus in a case in which a compression rate of an input frame is different from a predetermined compression rate. A predetermined compression rate may be a compression rate of a frame corresponding to a pre-stored parameter. In addition, the pre-stored parameter may be calculated as a result of machine learning for a plurality of frames having the same compression rate.

Referring to FIG. 6, an image processing apparatus may generate an improvement image 62 by performing an image quality improvement process to an input image 61. For example, the image processing apparatus may perform an image quality improvement process by passing the input image 61 through a plurality of layers 610-1, 610-2, 620-1, 620-2 and 630 for image quality improvement process.

In this regard, the first process to acquire a structural feature of an image by passing the input image 61 through the convolution layer 610-1 and a process operation of selectively passing the input image 41 through the ReLU layer 630 are the same as an operation of FIG. 3 and thus, the description thereof will be omitted.

The image processing apparatus may perform a second process to pass a structural feature acquired from the input image 61 through the quality control (QC) layer 620-1 and normalize the structural feature. For example, the image processing apparatus may perform the second process for the corresponding frame by using an image quality figure 63 corresponding to a compression rate of a frame. An image quality figure 63 corresponding to a compression rate of a frame may be acquired using metadata of a frame.

The image processing apparatus may pre-store a parameter corresponding to a predetermined compression rate. Referring to FIG. 6, the image processing apparatus may store BN 20 which is a parameter corresponding to a compression rate of 20% and BN 30 which is a parameter corresponding to a compression rate of 30%. Accordingly, a predetermined compression rate may be 20% and 30%. The BN 20 may be a result value optimized by inputting a plurality of frames of a compression rate of 20% and processing the input frames and through machine learning. The BN 30 may be a result calculated through machine learning regarding the compression rate of 30%.

The image processing apparatus may perform the second process using the image quality figure 63 of the input image 61. The image quality figure 63 may correspond to a compression rate of the input image 61. Referring to FIG. 6, a compression rate of the input image 61 may be 25% which is different from predetermined compression rates of 20% and 30%. The image processing apparatus may, as illustrated in FIG. 7, calculate a new parameter for a new compression rate other than a predetermined compression rate.

For example, the image processing apparatus may analyze linearity between a compression rate and a parameter by using a predetermined parameter corresponding to each of a plurality of compression rates and a plurality of compression rates.

Referring to FIG. 5, the image processing apparatus may analyze linearity between a compression rate and a parameter by using predetermined compression rates of 20% and 30% and the corresponding BN 20 and BN 30. In addition, the image processing apparatus may calculate a parameter for a compression rate of 25% by using linearity. For example, the image processing apparatus may calculate a parameter of QC 25 for a compression rate of 25% according to the mathematical equation (2) as shown below.

$$[BN\ 20, BN\ 30]*[0.5, 0.5] = QC\ 25 \qquad (2)$$

Then, as illustrated in FIG. 8, the image processing apparatus may, through the quality control layer 621-1, generate an improvement image 62 by performing a second process using QC 25 which is a new parameter corresponding to a compression rate of 25% of the input image 61 rather than pre-stored parameters of BN 20 and BN 30. Meanwhile, a method of using linearity is only a non-limiting example, and it is possible to calculate a new parameter through various algorithms.

The image processing apparatus may perform an image quality improvement process by repeatedly passing the input image 31 through a plurality of layers 610-2 and 621-2 performing the same function as the plurality of layers 610-1, 621-1 and 630 described above.

As described above, even if a frame having a new compression rate rather than a predetermined compression rate is input, a parameter corresponding to a new compression rate is calculated using a parameter trained for a predetermined compression rate, and thereby an optimized quality improvement is possible for a moving image having a plurality of frames.

Figure 9:
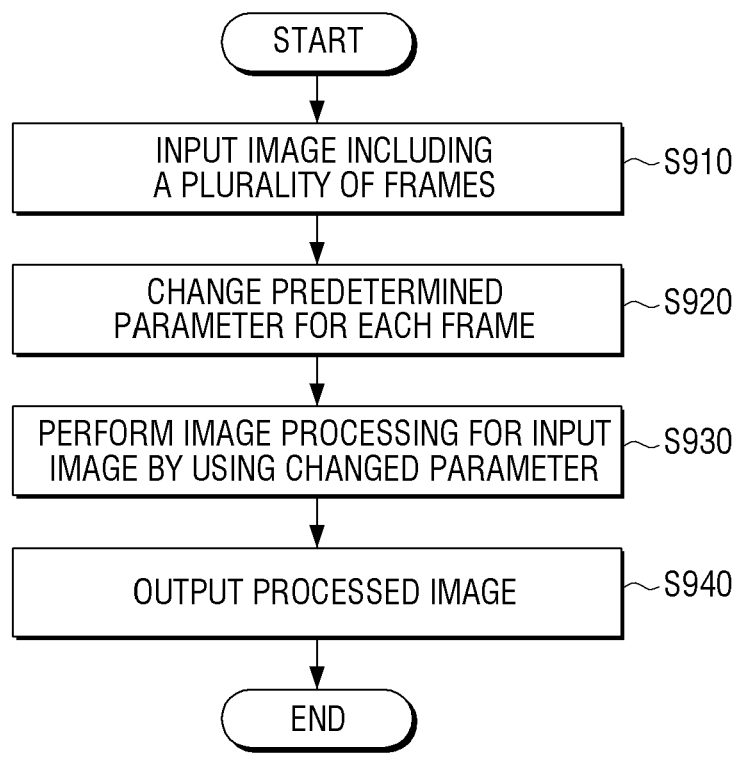
FIG. 9 is a flowchart provided to explain a method for processing an image, according to an example embodiment.

FIG. 9 is a flowchart provided to explain a method for processing an image, according to an example embodiment.

First, an image processing apparatus may receive an image including a plurality of frames, at operation 5910. For example, an input image may be a compressed image itself or an image generated by decoding a compressed image. In this case, a plurality of frames included in the input image may be generated by being compressed at various compression rates.

Then, the image processing apparatus may change a predetermined parameter for each frame, at operation 5920. For example, the image processing apparatus may change a predetermined parameter to a parameter corresponding to a compression rate of each frame. The predetermined parameter may be a parameter corresponding to a predetermined compression rate, which may be a parameter pre-stored in the image processing apparatus, and may be calculated as a result of machine learning for a plurality of frames having a predetermined compression rate.

When a compression rate of an input frame is any one of predetermined compression rates, the image processing apparatus may use a parameter corresponding to the compression rate from among predetermined parameters. When a compression rate of an input frame is a new compression rate which is different from than a predetermined compression rate, it is possible to calculate a new parameter corresponding to the new parameter by using a predetermined compression rate and the corresponding predetermined parameter. For example, the image processing apparatus may analyze linearity using a predetermined compression rate and a predetermined parameter, and calculate a new parameter corresponding to a new compression rate using the analyzed linearity.

Next, the image processing apparatus may process an input image by using the changed parameter, at operation 5930.

In detail, the image processing apparatus may perform at least one of decoding and quality improvement process of an input image. For example, when the input image is a compressed image, the image processing apparatus may perform a decoding process and a quality improvement process for the compressed image. When the input image is an image generated by decoding a compressed image, the image processing apparatus may perform a quality improvement image for the input image.

In addition, when a compression rate of frames included in an input frame is any one of predetermined compression rates, the image processing apparatus may perform an image process using a parameter corresponding to the compression rate from among predetermined parameters. When a compression rate of frames included in an input frame is a new compression rate different from a predetermined compression rate, the image processing apparatus may perform an image process using a new parameter corresponding to the calculated new compression rate.

In addition, the image processing apparatus may output a processed image, at operation 5940. For example, the image processing apparatus may transmit the processed image to an external apparatus, or display the processed image on a display provided in the image processing apparatus.

As described above, a method illustrated in FIG. 9 may be implemented in an image processing apparatus of FIG. 1 or 2.

According to the various example embodiments described above, even if a frame having a new compression rate rather than a predetermined compression rate is input, a parameter corresponding to a new compression rate is calculated using a parameter trained for a predetermined compression rate, and thereby an optimized quality improvement is possible for a moving image having a plurality of frames. Accordingly, it is not necessary to store parameters for various compression rates and thus, a memory consumption can be significantly reduced. In addition, the image quality improvement process can be performed at a level higher than a certain level even though the image quality variability can be expected and thus, it can be expected that the difference in image quality between frames is not large even though the compression rates are different.

Various example embodiments described above may be embodied in a recording medium that may be read by a computer or a similar apparatus to the computer by using software, hardware, or a combination thereof. According to the hardware embodiment, exemplary embodiments that are described in the present disclosure may be embodied by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. In some cases, embodiments described herein may be implemented by processor 110 itself. According to a software implementation, embodiments such as the procedures and functions described herein may be implemented with separate software modules. Each of the software modules may perform one or more of the functions and operations described herein.

A method for processing an image according to various example embodiments may be stored on a non-transitory readable medium. The non-transitory readable medium may be installed in various devices.

The non-transitory computer readable medium refers to a medium that stores data semi-permanently rather than storing data for a very short time, such as a register, a cache, a memory or etc., and is readable by an apparatus. In detail, programs for executing the aforementioned various methods may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing example embodiments and advantages are merely exemplary and are not to be construed as limiting the present disclosure. The present teaching may be readily applied to other types of devices. Also, the description of the example embodiments of the present disclosure is intended to be illustrative, and not to limit the scope of the claims, and many alternatives, modifications, and variations will be apparent to those skilled in the art.

What is claimed is:

1. An image processing apparatus, comprising:
a processor configured to:
in response to an image including a plurality of frames being input, acquire a feature value of the plurality of frames by inputting the image to a layer to acquire a structural feature of an image,
acquire a parameter of the plurality of frames by normalizing the acquired feature value using an image quality figure, the image quality figure corresponding to a compression rate of each of the plurality of frames, and
process the input image by using the parameter; and
an output interface configured to output the processed image,
wherein the processor is further configured to: normalize the acquired feature value by using a first parameter, and acquire the feature value of the plurality of frames by using a second parameter, and
wherein the second parameter has a same value even if a compression rate of a frame is changed.

2. The image processing apparatus as claimed in claim 1, further comprising:
a memory configured to store a predetermined parameter corresponding to a plurality of predetermined compression rates,
wherein the processor is further configured to:
in a case that a compression rate of a frame is one of the plurality of predetermined compression rates, perform an image process using a parameter corresponding to the compression rate from among the stored parameter, and
in a case that a compression rate of a frame is different from the plurality of predetermined compression rates, perform an image process by calculating a new parameter and store the new parameter in the memory.

3. The image processing apparatus as claimed in claim 2, wherein the processor is further configured to:
analyze linearity between a compression rate and a parameter by using the plurality of predetermined compression rates and the predetermined parameter; and
calculate a new parameter corresponding to a new compression rate based on the analyzed linearity.

4. The image processing apparatus as claimed in claim 2, wherein the predetermined parameter is calculated as a result of machine learning of a plurality of frames having a same compression rate.

5. The image processing apparatus as claimed in claim 1, wherein an image process is at least one of decoding and image quality improvement process for the plurality of frames, and
wherein the parameter is a parameter for the decoding and the image quality improvement process.

6. The image processing apparatus as claimed in claim 1, wherein the processor is further configured to acquire a compression rate of the plurality of frames by using a metadata of the plurality of frames.

7. The image processing apparatus as claimed in claim 1, wherein the output interface includes a communication interface for transmitting the processed image to an external apparatus.

8. The image processing apparatus as claimed in claim 1, wherein the output interface includes a display for displaying the processed image.

9. A method for processing an image, the method comprising:
receiving input of an image including a plurality of frames;

acquiring a feature value of the plurality of frames by inputting the image to a layer to acquire a structural feature of an image;

acquiring a parameter of the plurality of frames by normalizing the acquired feature value using an image quality figure, the image quality figure corresponding to a compression rate of each of the plurality of frames;

processing the input image by using the parameter; and outputting the processed image, wherein acquiring the parameter of the plurality of frames comprises normalizing the acquired feature value by using a first parameter, wherein the acquire the feature value comprises acquiring the feature value of the plurality of frames by using a second parameter, and wherein the second parameter has a same value even if a compression rate of a frame is changed.

10. The method as claimed in claim 9, further comprising:

storing a predetermined parameter corresponding to a plurality of predetermined compression rates, wherein the processing the image comprises:

in a case that a compression rate of a frame is one of the plurality of predetermined compression rates, performing an image process using a parameter corresponding to the compression rate from among the stored parameter, and in a case that a compression rate of a frame is different from the plurality of predetermined compression rates, performing an image process by calculating a new parameter and storing the new parameter in a memory.

11. The method as claimed in claim 10, wherein the processing the image comprises:

analyzing linearity between a compression rate and a parameter by using the plurality of predetermined compression rates and the predetermined parameter; and calculating a new parameter corresponding to a new compression rate based on the analyzed linearity.

12. The method as claimed in claim 10, wherein the predetermined parameter is calculated as a result of machine learning of a plurality of frames having a same compression rate.

13. The method as claimed in claim 9, wherein the processing of the image is at least one of decoding and image quality improvement process for the plurality of frames, and, wherein the parameter is a parameter for the decoding and the image quality improvement process.

14. The method as claimed in claim 9, further comprising:

acquiring a compression rate of the plurality of frames by using a metadata of the plurality of frames.

15. The method as claimed in claim 9, wherein the outputting comprises displaying the processed image or transmitting the processed image to an external apparatus.

16. A non-transitory computer-readable recording medium comprising a program for executing a method for processing an image, wherein the method for processing the image comprises:

receiving input of an image including a plurality of frames;

acquiring a feature value of the plurality of frames by inputting the image to a layer to acquire a structural feature of an image;

acquiring a parameter of the plurality of frames by normalizing the acquired feature value using an image quality figure, the image quality figure corresponding to a compression rate of each of the plurality of frames; and processing the input image by using the acquired parameter, wherein acquiring the parameter of the plurality of frames comprises normalizing the acquired feature value by using a first parameter, wherein the acquire the feature value comprises acquiring the feature value of the plurality of frames by using a second parameter, and wherein the second parameter has a same value even if a compression rate of a frame is changed.

* * * * *